United States Patent
Mehrotra et al.

(10) Patent No.: US 11,087,124 B1
(45) Date of Patent: Aug. 10, 2021

(54) SYSTEMS AND METHODS FOR DIGITAL DOCUMENT FIELD LOCATION IDENTIFICATION

(71) Applicant: FMR LLC, Boston, MA (US)

(72) Inventors: Tarang Mehrotra, Kolkata (IN);
Abhishek Vasant Asole, Nagpur (IN);
Geetha Janardhanan, Bangalore (IN);
Ranganath P. Kashyap, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/031,378

(22) Filed: Sep. 24, 2020

(51) Int. Cl.
*G06K 9/00* (2006.01)
*G06F 40/186* (2020.01)
*G06F 16/93* (2019.01)
*G06N 3/08* (2006.01)

(52) U.S. Cl.
CPC ....... *G06K 9/00449* (2013.01); *G06F 40/186* (2020.01); *G06K 9/00483* (2013.01); *G06N 3/08* (2013.01); *G06F 16/93* (2019.01)

(58) Field of Classification Search
None
See application file for complete search history.

(56) References Cited

U.S. PATENT DOCUMENTS

| | | | |
|---|---|---|---|
| 6,470,092 B1 * | 10/2002 | Li | G06T 7/0012 382/132 |
| 8,478,046 B2 | 7/2013 | Déjean | |
| 9,576,372 B2 | 2/2017 | Yamamoto | |
| 10,110,769 B2 * | 10/2018 | Medicherla | H04N 1/2166 |
| 10,708,358 B1 * | 7/2020 | Diasti | G06F 16/93 |
| 2006/0193008 A1 * | 8/2006 | Osaka | G06F 40/103 358/1.18 |
| 2006/0285172 A1 * | 12/2006 | Hull | G06F 16/583 358/448 |
| 2008/0143735 A1 * | 6/2008 | Besley | G06K 9/6211 345/582 |
| 2009/0313245 A1 * | 12/2009 | Weyl | G06F 16/5846 |
| 2013/0085935 A1 * | 4/2013 | Nepomniachtchi | G06K 9/38 705/40 |
| 2015/0242719 A1 * | 8/2015 | Kashiwagi | H04N 1/00037 358/1.12 |
| 2015/0278940 A1 | 10/2015 | Jasko et al. | |
| 2016/0234393 A1 * | 8/2016 | Kittaka | H04N 1/00212 |
| 2017/0132313 A1 * | 5/2017 | Kukla | G06F 16/338 |

(Continued)

*Primary Examiner* — Michelle M Entezari
(74) *Attorney, Agent, or Firm* — Proskauer Rose LLP

(57) ABSTRACT

Systems and methods for identifying fields in an electronic document using classification and scale invariant template matching. The method includes receiving an electronic document having fields and processing the electronic document into digital pages. The method also includes determining, for each of the digital pages, a corresponding document type. The method further includes identifying at least one of the digital pages containing a structured field based on the document type. The method also includes extracting a structured template from a database corresponding to the document type and identifying an optimal match between the structured field and the structured template using scale invariant template matching. The method further includes determining, in response to identifying the optimal match, coordinates corresponding to the structured field.

18 Claims, 7 Drawing Sheets

(56) References Cited

U.S. PATENT DOCUMENTS

| | | | |
|---|---|---|---|
| 2018/0024974 A1* | 1/2018 | Welinder | G06T 7/194 |
| | | | 715/229 |
| 2020/0076972 A1* | 3/2020 | Machida | H04N 1/00424 |
| 2020/0089946 A1* | 3/2020 | Mallick | G06K 9/00463 |
| 2020/0097713 A1* | 3/2020 | Cramer | G06K 9/00449 |

* cited by examiner

SYSTEMS AND METHODS FOR DIGITAL DOCUMENT FIELD LOCATION IDENTIFICATION

FIELD OF THE INVENTION

The present invention relates generally to systems and methods for identifying fields in an electronic document, including systems and methods for identifying fields in an electronic document using classification and scale invariant template matching.

BACKGROUND OF THE INVENTION

Many organizations process a large volume of forms submitted by customers for various business processes. While many of these processes are digital, a significant number of forms are sent by mail. During processing, many of the received forms have defects which results in the forms being labeled as "Not In Good Order" or "NIGO." For example, some of the received forms may have a missing signature for one or more of the required fields.

However, handling NIGO forms can be a challenge requiring manual intervention. Automation of manual processes in the process workflow is a unique opportunity for organizations to reduce the time and cost associated with each NIGO form. Generally, processing NIGO forms due to missing signatures requires the incomplete forms to be physically mailed to the participant for resolution. Therefore, there is a need for automating this workflow using e-signature capabilities in order to automatically identify the page and coordinates of the participants signature field and other types of structured fields in electronic documents.

SUMMARY OF THE INVENTION

Accordingly, an object of the invention is to provide systems and methods for identifying structured fields in an electronic document. It is an object of the invention to provide systems and methods for identifying fields in an electronic document using machine learning. It is an object of the invention to provide systems and methods for identifying the page and coordinates of missing structured fields in electronic documents. It is an object of the invention to provide systems and methods for identifying fields in an electronic document using classification and scale invariant template matching.

In some aspects, a computerized method for identifying fields in an electronic document using classification and scale invariant template matching includes receiving, by a server computing device, an electronic document including fields. The method further includes processing, by the server computing device, the electronic document into digital pages. The method also includes, for each of the digital pages, determining, by the server computing device, a corresponding document type.

The method also includes identifying, by the server computing device, at least one of the digital pages containing a structured field based on the document type. Further, the method includes extracting, by the server computing device, a structured template from a database corresponding to the document type. The method also includes identifying, by the server computing device, an optimal match between the structured field and the structured template using scale invariant template matching. The method further includes, in response to identifying the optimal matching, determining, by the server computing device, coordinates corresponding to the structured field.

In some embodiments, the server computing device is further configured to process the received electronic document by converting the electronic document into a portable network graphics format, extracting the digital pages, and converting the digital pages into grayscale.

In some embodiments, the server computing device is further configured to identify the at least one of the digital pages containing the structured field using a convolutional neural network. In other embodiments, the server computing device is further configured to identify the at least one of the digital pages containing the structured field using a template database.

In some embodiments, the server computing device is further configured to extract the coordinates corresponding to the structured field from the electronic document based on the optimal match. For example, in some embodiments, the server computing device is further configured to rescale the extracted coordinates corresponding to the structured field to an original document resolution.

In some embodiments, the server computing device is configured to identify the optimal match between the structured field and the structured template by scaling the structured template in an x-direction and calculating a correlation for each of the pixels in the structured field and the structured template. In other embodiments, the server computing device is configured to identify the optimal match between the structured field and the structured template by scaling the structured template in a y-direction and calculating a correlation for each of the pixels in the structured field and the structured template. In some embodiments, the server computing device is configured to identify the optimal match between the structured field and the structured template by rotating the structured template and calculating a correlation for each of the pixels in the structured field and the structured template.

In some embodiments, the server computing device is configured to identify the optimal match between the structured field and the structured template by rotating the structured template, scaling the structured template in an x-direction, scaling the structured template in a y-direction, and calculating a correlation for each of the pixels in the structured field and the structured template.

In some aspects, a system for identifying fields in an electronic document using classification and scale invariant template matching includes a server computing device communicatively coupled to a database over a network. The server computing device is configured to receive an electronic document including fields. The server computing device is also configured to process the electronic document into digital pages. Further, the server computing device is configured to, for each of the digital pages, determine a corresponding document type.

The server computing device is also configured to identify at least one of the digital pages containing a structured field based on the document type. Further, the server computing device is configured to extract a structured template from the database corresponding to the document type. The server computing device is further configured to identify an optimal match between the structured field and the structured template using scale invariant template matching. The server computing device is also configured to, in response to identifying the optimal match, determine coordinates corresponding to the structured field.

In some embodiments, the server computing device is further configured to process the received electronic document by converting the electronic document into a portable network graphics format, extracting the digital pages, and converting the digital pages into grayscale.

In some embodiments, the server computing device is further configured to identify the at least one of the digital pages containing the structured field using a convolutional neural network. In other embodiments, the server computing device is further configured to identify the at least one of the digital pages containing the structured field using a template database.

In some embodiments, the server computing device is further configured to extract the coordinates corresponding to the structured field from the electronic document based on the optimal match. For example, in some embodiments, the server computing device is further configured to rescale the extracted coordinates corresponding to the structured field to an original document resolution.

In some embodiments, the server computing device is configured to identify the optimal match between the structured field and the structured template by scaling the structured template in an x-direction and calculating a correlation for each of the pixels in the structured field and the structured template. In other embodiments, the server computing device is configured to identify the optimal match between the structured field and the structured template by scaling the structured template in a y-direction and calculating a correlation for each of the pixels in the structured field and the structured template. In some embodiments, the server computing device is configured to identify the optimal match between the structured field and the structured template by rotating the structured template and calculating a correlation for each of the pixels in the structured field and the structured template.

In some embodiments, the server computing device is configured to identify the optimal match between the structured field and the structured template by rotating the structured template, scaling the structured template in an x-direction, scaling the structured template in a y-direction, and calculating a correlation for each of the pixels in the structured field and the structured template.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for identifying fields in an electronic document. The system and methods can include mechanisms or methods for identifying fields in an electronic document using machine learning. The systems and methods described herein can provide systems and methods for identifying the page and coordinates of missing signature fields in electronic documents. The systems and methods described herein can include one or more mechanisms or methods for identifying fields in an electronic document using classification and scale invariant template matching.

Figure 1:
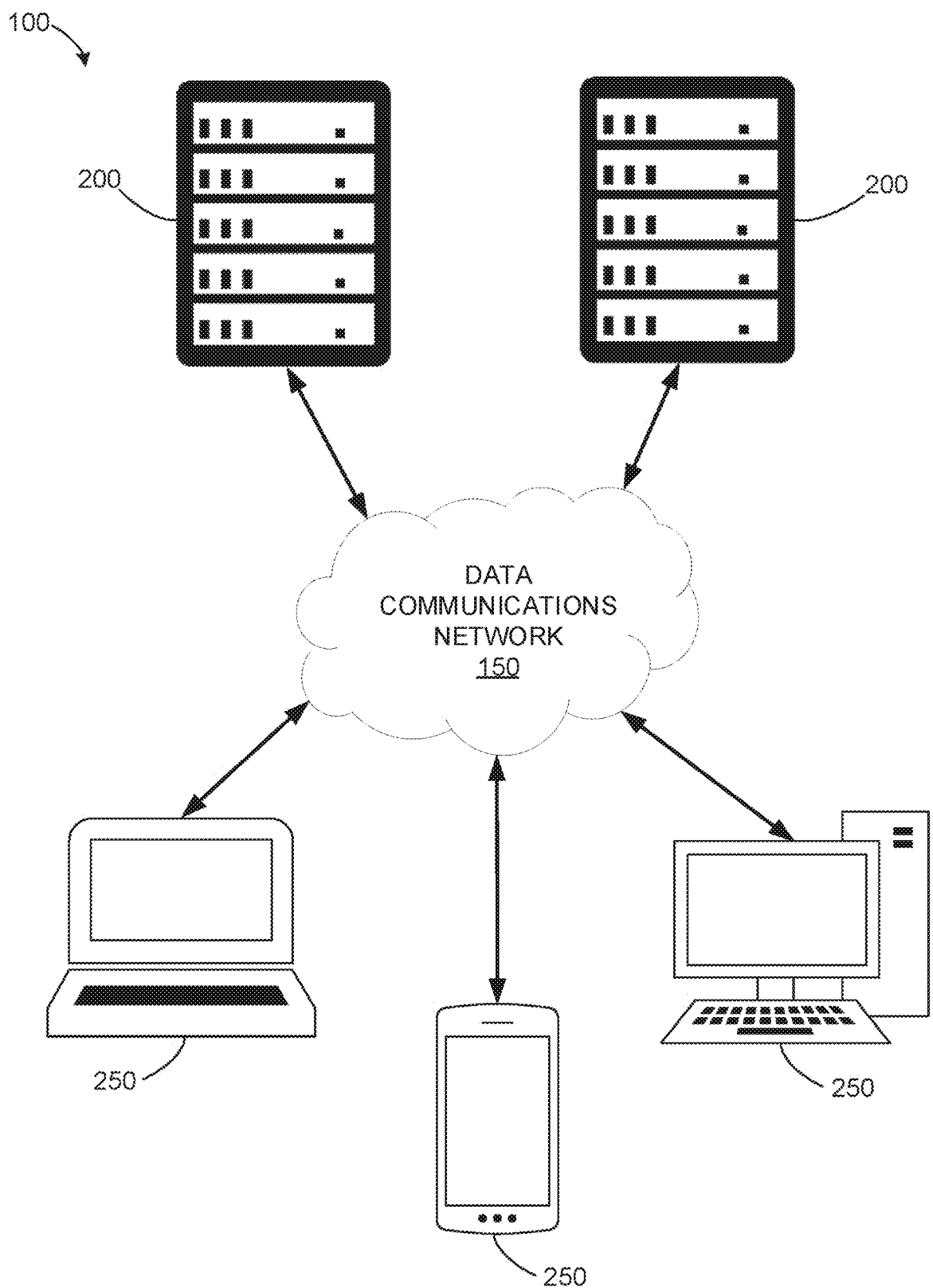
FIG. 1 is a block diagram of an exemplary data communications network, according to embodiments of the technology described herein.
Figure 2:
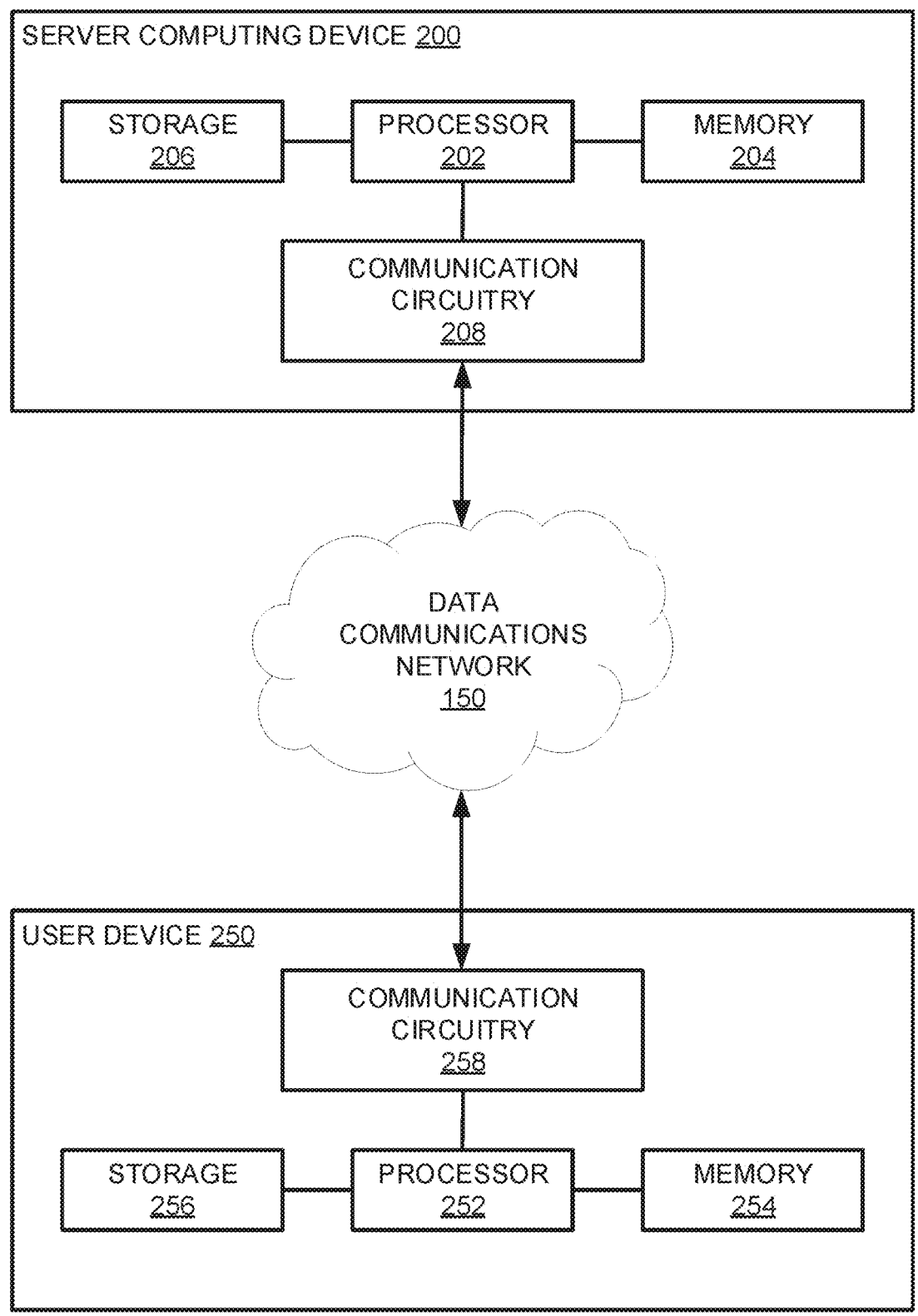
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth, Wi-Fi, or any comparable data transfer connection. The user devices 250 can include personal workstations, laptops, tablets, mobile devices, or any other comparable device.

Customers of organizations often submit forms or electronic documents by mail or upload via a mobile application. Once received by the organization, the forms or electronic documents are scanned and processed further. The forms that do not have the required details are labeled "Not In Good Order" or "NIGO." Generally, if a form is labeled NIGO, the organization communicates with the participant and, in most cases, the forms are sent by mail to the participant for them to make the necessary correction. The completed forms are then subsequently sent back to the organization by mail or uploaded via the mobile application. The process of printing and sending the form via mail for missing signature NIGO forms adds a significant amount of time and cost in processing the form.

Figure 3:
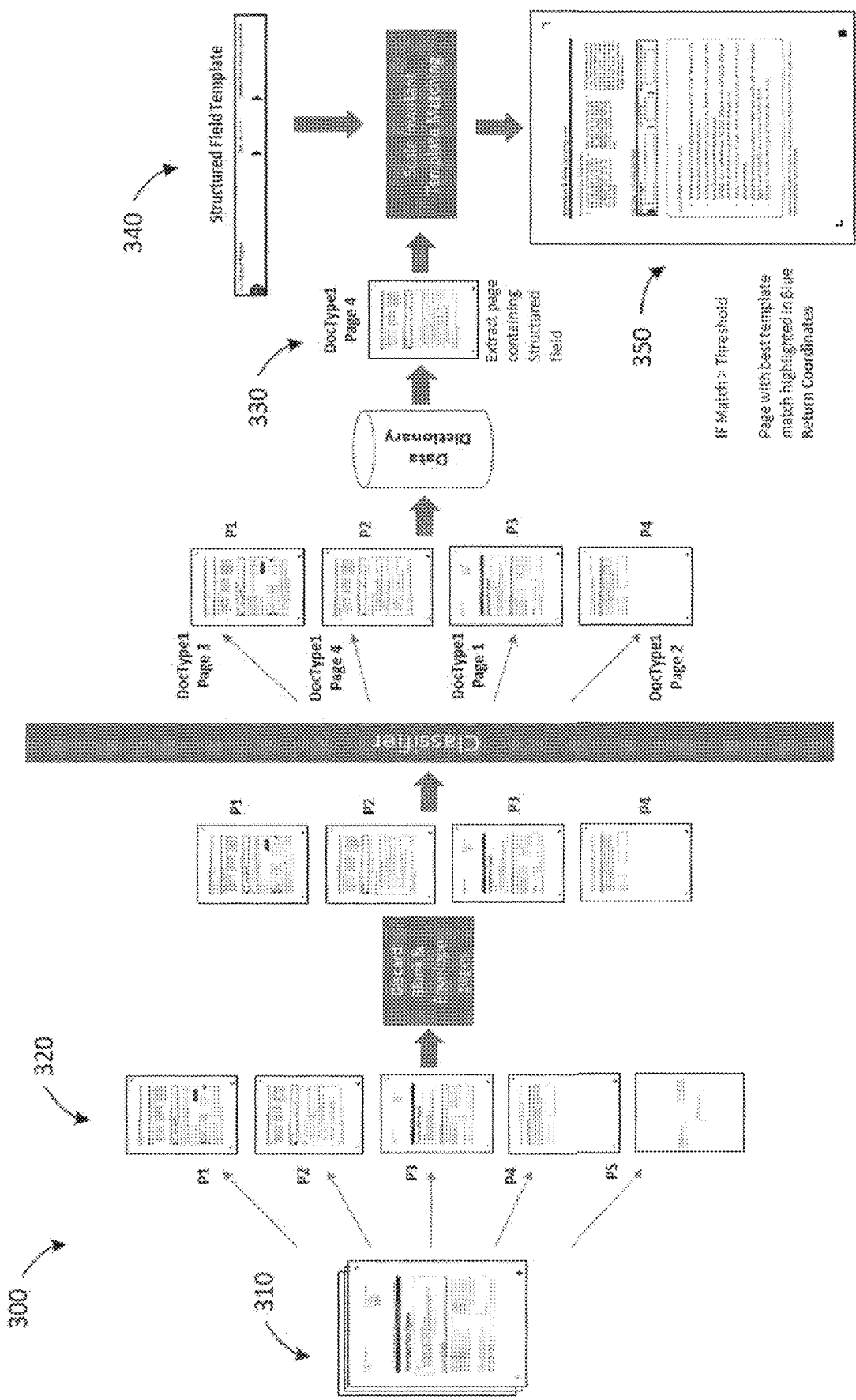
FIG. 3 is a diagram showing a visualization of an exemplary electronic document processed using image processing capabilities, according to embodiments of the technology described herein.

The systems and methods described herein provide one or more mechanisms or methods for removing the manual process and automate using electronic signature or any third party eSignature services, such as DocuSign™. For example, referring to FIG. 3, an exemplary electronic document 310 processed using image processing capabilities is illustrated. To enable the automation, the scanned electronic documents 310 are passed through the image processing capability in order to identify the coordinates of structured fields 330 (e.g., signature fields). For example, the electronic document 310 is first processed to discard blank and envelope pages, and to identify individual digital pages 320. Each digital page 320 is labeled with a document type using a convolutional neural network in order to identify the digital pages having structured fields 330. The system then compares and correlates the structured field 330 with a structured template 340 using scale invariant template matching in order to determine the coordinates of the structured fields 330 that need to be executed.

Figure 4:
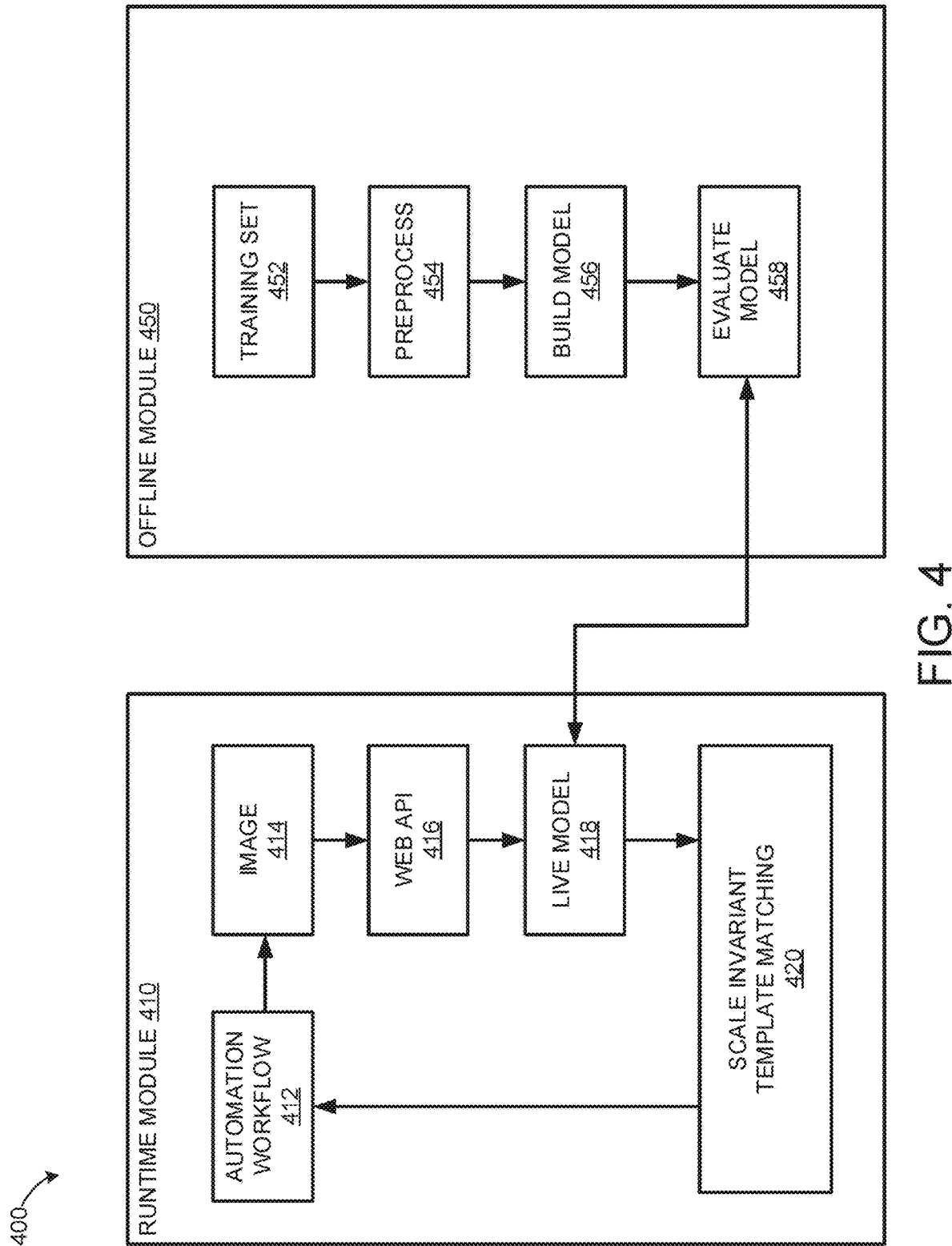
FIG. 4 is a diagram showing a visualization of an exemplary image processing architecture for identifying fields in an electronic document using a convolutional neural network and scale invariant template matching, according to embodiments of the technology described herein.

Referring to FIG. 4, an exemplary image processing architecture 400 for identifying fields in an electronic document 310 using a convolutional neural network and scale invariant template matching 420 is illustrated. Architecture 400 includes runtime module 410 and offline module 450. Offline module 450 includes training set 452, preprocess 454, build model 456, and evaluate model 458. The offline module 450 creates a model that can classify incoming digital images as one of the document types and label each of the images with the document type. This is equivalent to identifying an image as a dog and then labeling a specific breed. Before classifying, each electronic document 310 is broken into individual digital pages 320 and the model is trained until it classifies each digital page as one of the form types and page number. For example, each electronic document 310 is verified for adhering to the document types the model is trained for. Each individual digital page 320 of the electronic document 310 is labeled with a document type and page number, and renamed. The digital pages 320 that have irrelevant data are discarded. In some embodiments, each digital page 320 is resized to 700×900 pixels for uniform sizing and converted to grayscale.

Figure 5:
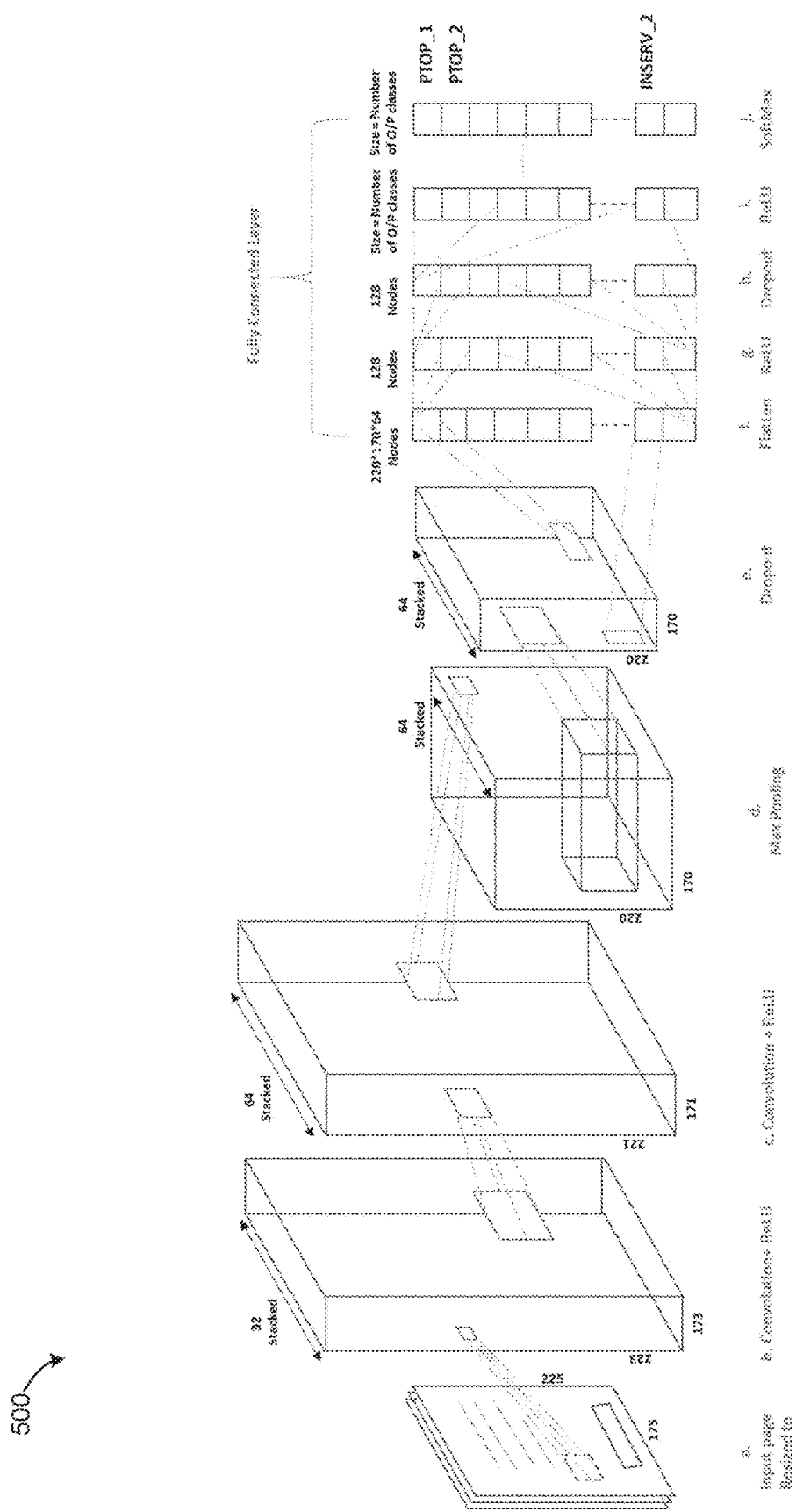
FIG. 5 is a diagram showing a visualization of an exemplary image classification model using a convolutional neural network, according to embodiments of the technology described herein.

Once the digital pages 320 have been preprocessed, each of the digital pages 320 are passed through convolutional neural network layers for classification as one of the types of pages. The model is trained until each digital page 320 is classified correctly as expected. For example, referring to FIG. 5, an exemplary image classification model using a convolutional neural network is illustrated. The model process includes layers involving convolution, ReLU, max pooling, dropout, flatten, and SoftMax. Convolution involves identifying patterns and edges in the image. ReLU is an activation layer that brings non-linearity into the system. Max Pooling involves noise reduction and down sampling. Dropout involves reducing overfitting. Flatten involves converting an n-dimensional array to a 1-dimensional array. SoftMax involves assigning a probability to each class.

Runtime module 410 includes automation workflow 412, image 414, WEB API 416, live model 418, and scale invariant template matching 420. The runtime module 410 is invoked by automation workflow 412 as a WEB API 416. The electronic document 310 is passed through the live model 418 for classification and the scale invariant template matching 420 for identifying the coordinates of the structured field 330. Live model 418 is updated by the offline module 450. The runtime module 410 receives the electronic document 310 for identifying the coordinates (page number, x coordinate, and y coordinate) for further processing. In some embodiments, the electronic document 310 is split into individual digital pages 320 and resized to 175×225 pixels and converted to grayscale. Each of the digital pages 320 are passed through live model 418 to classify the digital page 320 as one of the types of documents and particular page. The runtime module 410 identifies the digital page 320 that includes a structured field 330.

Figure 6:
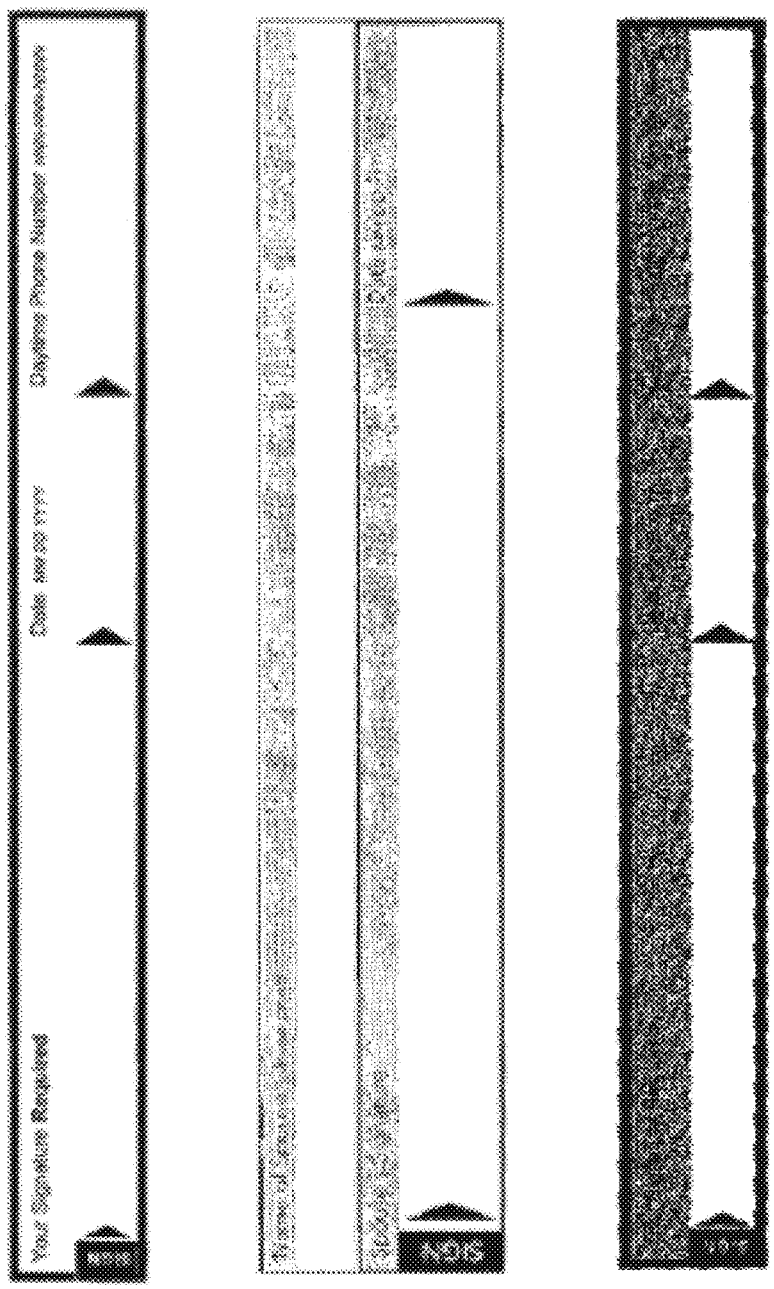
FIG. 6 is a diagram showing a visualization of exemplary structured templates, according to embodiments of the technology described herein.

The runtime module 410 then looks up a structured template 340 to be matched based on the document type. For example, referring to FIG. 6, exemplary structured templates 340 are illustrated. In some embodiments, each type of form has the signature, name, and date fields in different formats. Generally, a simple template matching algorithm matches a template for different points on an image. A scale invariant template matching algorithm 420 on the other hand scales the template by a range of values for matching to get the optimal match. This can be significant because the input digital page 320 and the structured template 340 may be at a different scale and/or aspect ratio. In some embodiments, the scale invariant template matching algorithm 420 iteratively identifies the optimal match of the structured template 340 by adjusting the structured template 340 size from 0.8× of 700×900 to 1.05× of 700×900. In other embodiments, the scale invariant template matching algorithm 420 iteratively identifies the optimal match of the structured template 340 by adjusting the structured template 340 size from 0.6× of 700×900 to 1.2× of 700×900.

In some aspects, the systems and methods described herein provide for training and testing datasets for offline convolutional neural network model building. The system and methods provide for preprocessing the training set documents, and optimizing the classification and accuracy of digital pages using the convolutional neural network model. The systems and methods described herein provide for validating the convolutional neural network model using testing data set. The systems and methods described herein provide for integrating convolutional neural network and scale invariant template matching modules. The systems and methods described herein provide for preprocessing and classification of inbound electronic documents using the convolutional neural network module during runtime. The systems and methods described herein provide for extracting the digital page with the structured field and corresponding structured template from a data dictionary. The systems and methods described herein provide for scaling the structure template to get highest correlation match of the structured field on the digital image. The systems and methods described herein provide for extracting and rescaling the coordinates to original document resolution.

Figure 7:
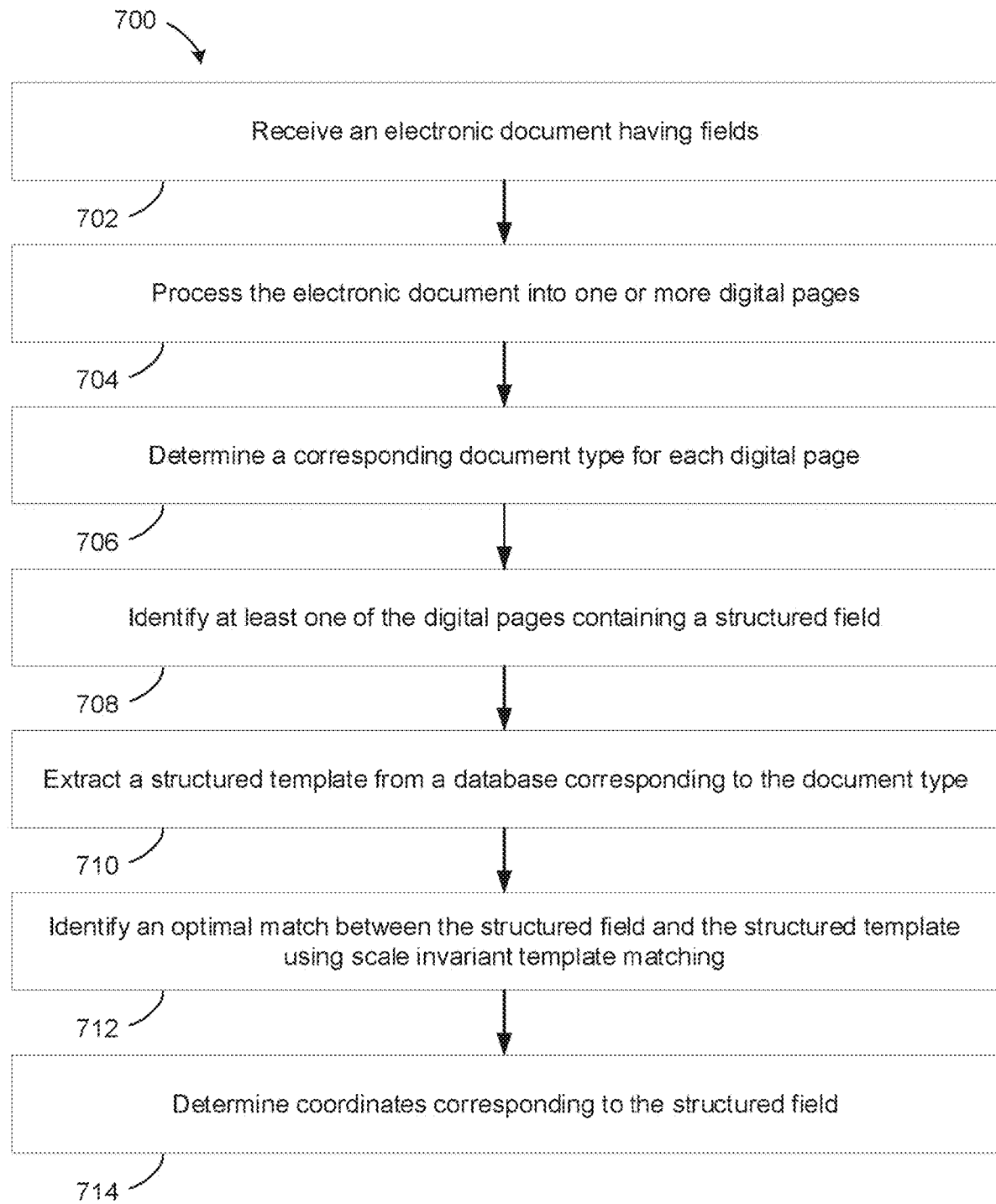
FIG. 7 is a flow diagram of a computer-implemented method for identifying fields in an electronic document using classification and scale invariant template matching, according to embodiments of the technology described herein.

For example, referring to FIG. 7, a process 700 for identifying fields in an electronic document 310 using classification and scale invariant template matching 420 is illustrated. The process 700 begins by receiving, by a server computing device 200, an electronic document 310 including fields in step 702. Process 700 continues by processing, by the server computing device 200, the electronic document 310 into digital pages 320 in step 704. For example, in some embodiments, the server computing device 200 is further configured to process the electronic document 310 by converting the electronic document 310 into a portable network graphics format, extracting the digital pages 320, and converting the digital pages 320 into grayscale.

Process 700 continues by, for each of the digital pages 320, determining, by the server computing device 200, a corresponding document type in step 706. Process 700 continues by identifying, by the server computing device

200, at least one of the digital pages 320 containing a structured field 330 based on the document type in step 708. For example, in some embodiments, the server computing device 200 is configured to identify the at least one of the digital pages 320 containing the structured field 330 using a convolutional neural network. In some embodiments, the server computing device 200 is further configured to identify the at least one of the digital pages 320 containing the structured field 330 using a template database. Process 700 continues by extracting, by the server computing device 200, a structured template 340 from a database corresponding to the document type in step 710.

Process 700 continues by, identifying, by the server computing device 200, an optimal match between the structured field 330 and the structured template 340 using scale invariant template matching 420 in step 712. For example, in some embodiments, the server computing device 200 is configured to identify the optimal match between the structured field 330 and the structured template 340 by scaling the structured template 340 in an x-direction and calculating a correlation for each of the pixels in the structured field 330 and the structured template 340. In other embodiments, the server computing device 200 is configured to identify the optimal match between the structured field 330 and the structured template 340 by scaling the structured template 340 in a y-direction and calculating a correlation for each of the pixels in the structured field 330 and the structured template 340. In some embodiments, the server computing device 200 is configured to identify the optimal match between the structured field 330 and the structured template 340 by rotating the structured template 340 and calculating a correlation for each of the pixels in the structured field 330 and the structured template 340.

In some embodiments, the server computing device 200 is configured to identify the optimal match between the structured field 330 and the structured template 340 using scale invariant template matching 420 by rotating the structured template 340, scaling the structured template 340 in an x-direction, scaling the structured template 340 in a y-direction, and calculating a correlation for each of the pixels in the structured field 330 and the structured template 340.

Process 700 finishes by determining, by the server computing device 200, coordinates corresponding to the structured field 330 in step 714. In some embodiments, the server computing device 200 is further configured to extract the coordinates corresponding to the structured field 330 from the electronic document 310 based on the optimal match. For example, in some embodiments, the server computing device 200 is further configured to rescale the extracted coordinates corresponding to the structured field 330 to an original document resolution.

In some aspects, process 700 can be implemented on a system for identifying fields in an electronic document 310 using classification and scale invariant template matching 420. The system includes a server computing device 200 communicatively coupled to a database over a network 150. The server computing device 200 is configured to receive an electronic document 310 including fields. The server computing device 200 is further configured to process the electronic document 310 into digital pages 320. The server computing device 200 is also configured to, for each of the digital pages 320, determine a corresponding document type.

Further, the server computing device 200 is configured to identify at least one of the digital pages 320 containing a structured field 330 based on the document type. The server computing device 200 is also configured to extract a structured template 340 from the database corresponding to the document type. Further, the server computing device 200 is configured to identify an optimal match between the structured field 330 and the structured template 340 using scale invariant template matching 420. The server computing device 200 is further configured to determine coordinates corresponding to the structured field 330 in response to identifying the optimal match.

In some embodiments, the server computing device 200 is configured to identify the optimal match between the structured field 330 and the structured template 340 using scale invariant template matching 420 by rotating the structured template 340, scaling the structured template 340 in an x-direction, scaling the structured template 340 in a y-direction, and calculating a correlation for each of the pixels in the structured field 330 and the structured template 340.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A computerized method for identifying fields in an electronic document using classification and scale invariant template matching, the method comprising:

receiving, by a server computing device, an electronic document comprising a plurality of fields;

processing, by the server computing device, the electronic document into a plurality of digital pages;

discarding, by the server computing device, a plurality of blank and envelope pages from the plurality of digital pages;

for each of the plurality of digital pages, determining, by the server computing device, a corresponding document type;

identifying, by the server computing device, at least one of the plurality of digital pages containing a structured field based on the document type;

extracting, by the server computing device, a structured template from a database corresponding to the document type;

identifying, by the server computing device, an optimal match between the structured field and the structured template using scale invariant template matching;

in response to identifying the optimal match, determining, by the server computing device, coordinates corresponding to the structured field;
extracting, by the server computing device, the coordinates corresponding to the structured field from the electronic document based on the optimal match; and
rescaling the extracted coordinates corresponding to the structured field to an original document resolution.

2. The computerized method of claim 1, wherein the server computing device is further configured to process the received electronic document by:
converting the electronic document into a portable network graphics format;
extracting the plurality of digital pages; and
converting the plurality of digital pages into grayscale.

3. The computerized method of claim 1, wherein the server computing device is further configured to identify the at least one of the plurality of digital pages containing the structured field using a convolutional neural network.

4. The computerized method of claim 1, wherein the server computing device is further configured to identify the at least one of the plurality of digital pages containing the structured field using a template database.

5. The computerized method of claim 1, wherein the server computing device is configured to identify the optimal match between the structured field and the structured template by scaling the structured template in an x-direction and calculating a correlation for each of the pixels in the structured field and the structured template.

6. The computerized method of claim 1, wherein the server computing device is configured to identify the optimal match between the structured field and the structured template by scaling the structured template in a y-direction and calculating a correlation for each of the pixels in the structured field and the structured template.

7. The computerized method of claim 1, wherein the server computing device is configured to identify the optimal match between the structured field and the structured template by rotating the structured template and calculating a correlation for each of the pixels in the structured field and the structured template.

8. The computerized method of claim 1, wherein the server computing device is configured to identify the optimal match between the structured field and the structured template by:
rotating the structured template;
scaling the structured template in an x-direction;
scaling the structured template in a y-direction; and
calculating a correlation for each of the pixels in the structured field and the structured template.

9. A system for identifying fields in an electronic document using classification and scale invariant template matching, the system comprising:
a server computing device communicatively coupled to a database over a network, the server computing device configured to:
receive an electronic document comprising a plurality of fields;
process the electronic document into a plurality of digital pages;
discard a plurality of blank and envelope pages from the plurality of digital pages;
for each of the plurality of digital pages, determine a corresponding document type;
identify at least one of the plurality of digital pages containing a structured field based on the document type;
extract a structured template from the database corresponding to the document type;
identify an optimal match between the structured field and the structured template using scale invariant template matching;
in response to identifying the optimal match, determine coordinates corresponding to the structured field;
extract the coordinates corresponding to the structured field from the electronic document based on the optimal match; and
rescale the extracted coordinates corresponding to the structured field to an original document resolution.

10. The system of claim 9, wherein the server computing device is further configured to process the received electronic document by:
converting the electronic document into a portable network graphics format;
extracting the plurality of digital pages; and
converting the plurality of digital pages into grayscale.

11. The system of claim 9, wherein the server computing device is further configured to identify the at least one of the plurality of digital pages containing the structured field using a convolutional neural network.

12. The system of claim 9, wherein the server computing device is further configured to identify the at least one of the plurality of digital pages containing the structured field using a template database.

13. The system of claim 9, wherein the server computing device is configured to identify the optimal match between the structured field and the structured template by scaling the structured template in an x-direction and calculating a correlation for each of the pixels in the structured field and the structured template.

14. The system of claim 9, wherein the server computing device is configured to identify the optimal match between the structured field and the structured template by scaling the structured template in a y-direction and calculating a correlation for each of the pixels in the structured field and the structured template.

15. The system of claim 9, wherein the server computing device is configured to identify the optimal match between the structured field and the structured template by rotating the structured template and calculating a correlation for each of the pixels in the structured field and the structured template.

16. The system of claim 9, wherein the server computing device is configured to identify the optimal match between the structured field and the structured template by:
rotating the structured template;
scaling the structured template in an x-direction;
scaling the structured template in a y-direction; and
calculating a correlation for each of the pixels in the structured field and the structured template.

17. The computerized method of claim 8, wherein the server computing device is configured to scale the structured template in the x-direction and the y-direction from about 0.8× to about 1.05×.

18. The system of claim 16, wherein the server computing device is configured to scale the structured template in the x-direction and the y-direction from about 0.8× to about 1.05×.

* * * * *